(12) United States Patent
Tillotson

(10) Patent No.: US 10,893,004 B2
(45) Date of Patent: Jan. 12, 2021

(54) CONFIGURABLE DETECTION OF NETWORK TRAFFIC ANOMALIES AT SCALABLE VIRTUAL TRAFFIC HUBS

(71) Applicant: Amazon Technologies, Inc., Seattle, WA (US)

(72) Inventor: Paul John Tillotson, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 91 days.

(21) Appl. No.: 16/196,691

(22) Filed: Nov. 20, 2018

(65) Prior Publication Data

US 2020/0162407 A1    May 21, 2020

(51) Int. Cl.
*H04L 12/939*    (2013.01)
*H04L 12/26*    (2006.01)
*H04L 12/931*    (2013.01)

(52) U.S. Cl.
CPC ........... *H04L 49/555* (2013.01); *H04L 43/16* (2013.01); *H04L 49/70* (2013.01)

(58) Field of Classification Search
CPC ....... H04L 49/555; H04L 49/70; H04L 12/28; H04L 12/4633; H04L 12/939; H04L 12/26; H04L 12/931; H04L 45/64; H04L 43/00; H04L 43/16; H04L 41/0896; H04L 12/56; H04L 43/08; H04L 43/0805; H04L 29/06; H04L 47/10; H04L 47/32; H04L 47/30; H04L 43/0894; H04L 43/0829; H04L 63/0442; H04L 63/0254; H04L 63/0263; H04L 63/1416; H04L 63/0227; H04L 63/1425; H04L 43/028; H04L 43/0888; H04L 63/1441; H04L 43/0858; H04L 43/0882; H04L 43/106; H04L 41/142; H04L 43/0835; H04L 41/5009; H04L 12/851; H04L 12/803; H04L 12/741; H04L 29/12; H04L 12/935; H04L 12/825; H04L 12/46; H04L 12/947; H04L 43/0817; H04L 12/4641; H04L 49/25; H04L 69/22; H04L 47/2483; H04L 47/25; H04L 49/30; H04L 61/2596; H04L 1/24; H04L 47/125;
(Continued)

(56) References Cited

U.S. PATENT DOCUMENTS 6,993,021 B1    1/2006 Chuah et al.
7,782,782 B1    8/2010 Ferguson et al.
(Continued)

OTHER PUBLICATIONS

Albert Greenberg, et al "VL2: A Scalable and Flexible Data Center Network" Communications of the ACM, vol. 54, No. 3, Mar. 2011, pp. 1-10.
(Continued)

*Primary Examiner* — Hardikkumar D Patel
(74) *Attorney, Agent, or Firm* — Robert C. Kowert; Kowert, Hood, Munyon, Rankin & Goetzel, P.C.

(57) ABSTRACT

Packets of a network flow are received at a virtual traffic hub, which includes an action implementation layer at which routing actions generated at a decisions layer are performed. One or more properties of one or more packets of the flow are analyzed at the virtual traffic hub. An indication of an anomaly of the flow, detected based at least in part on the analysis, is provided to one or more destinations.

20 Claims, 10 Drawing Sheets

(58) Field of Classification Search
CPC ..... H04L 45/74; H04L 61/6068; H04L 43/04; H04N 21/835; H04N 21/2541; H04N 7/173
See application file for complete search history.

(56) References Cited

U.S. PATENT DOCUMENTS

| | | |
|---|---|---|
| 7,865,586 B2 | 1/2011 | Cohn |
| 8,244,909 B1 | 8/2012 | Hanson et al. |
| 8,331,371 B2 | 12/2012 | Judge et al. |
| 8,358,658 B2 | 1/2013 | Flynn et al. |
| 8,478,896 B2 | 7/2013 | Ehlers |
| 8,693,470 B1 | 4/2014 | Maxwell et al. |
| 2008/0225875 A1* | 9/2008 | Wray ............... H04L 12/4633 370/419 |
| 2016/0359872 A1* | 12/2016 | Yadav ............... H04L 43/0894 |

OTHER PUBLICATIONS

Chuanxiong Guo, et al "BCube: A High Performance, Server-centric Network Architecture for Modular Data Centers" SIGCOMM'09 Aug. 17-21, pp. 1-12.
"On the Impact of Packet Spraying in Data Center Networks", Advait Dixit, et al., 2013, pp. 1-9.
U.S. Appl. No. 16/136,142, filed Sep. 19, 2018, Paul John Tillotson.
U.S. Appl. No. 16/136,138, filed Sep. 19, 2018, Paul John Tillotson.
U.S. Appl. No. 16/136,137, filed Sep. 19, 2018, Paul John Tillotson.
U.S. Appl. No. 16/136,133, filed Sep. 19, 2018, Paul John Tillotson.
U.S. Appl. No. 16/136,131, filed Sep. 19, 2018, Paul John Tillotson.
U.S. Appl. No. 16/196,717, filed Nov. 20, 2018, Bashuman Deb.
U.S. Appl. No. 16/196,709, filed Nov. 20, 2018, Bashuman Deb.

\* cited by examiner

CONFIGURABLE DETECTION OF NETWORK TRAFFIC ANOMALIES AT SCALABLE VIRTUAL TRAFFIC HUBS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

As demand for virtualization-based services at provider networks has grown, more and more networking and inter-connectivity-related features may have to be added to meet the requirements of applications being implemented using the services. Many such features may require network packet address manipulation in one form or another, e.g., at level 3 or level 4 of the open systems interconnect stack. Some clients of virtualized computing services may wish to employ customized policy-based packet processing for application traffic flowing between specific sets of endpoints. Using ad-hoc solutions for all the different types of packet transformation requirements may not scale in large provider networks at which the traffic associated with hundreds of thousands of virtual or physical machines may be processed concurrently. Furthermore, detecting and responding to anomalous traffic patterns in such large provider networks may present a non-trivial technical challenge.

Figure 1:
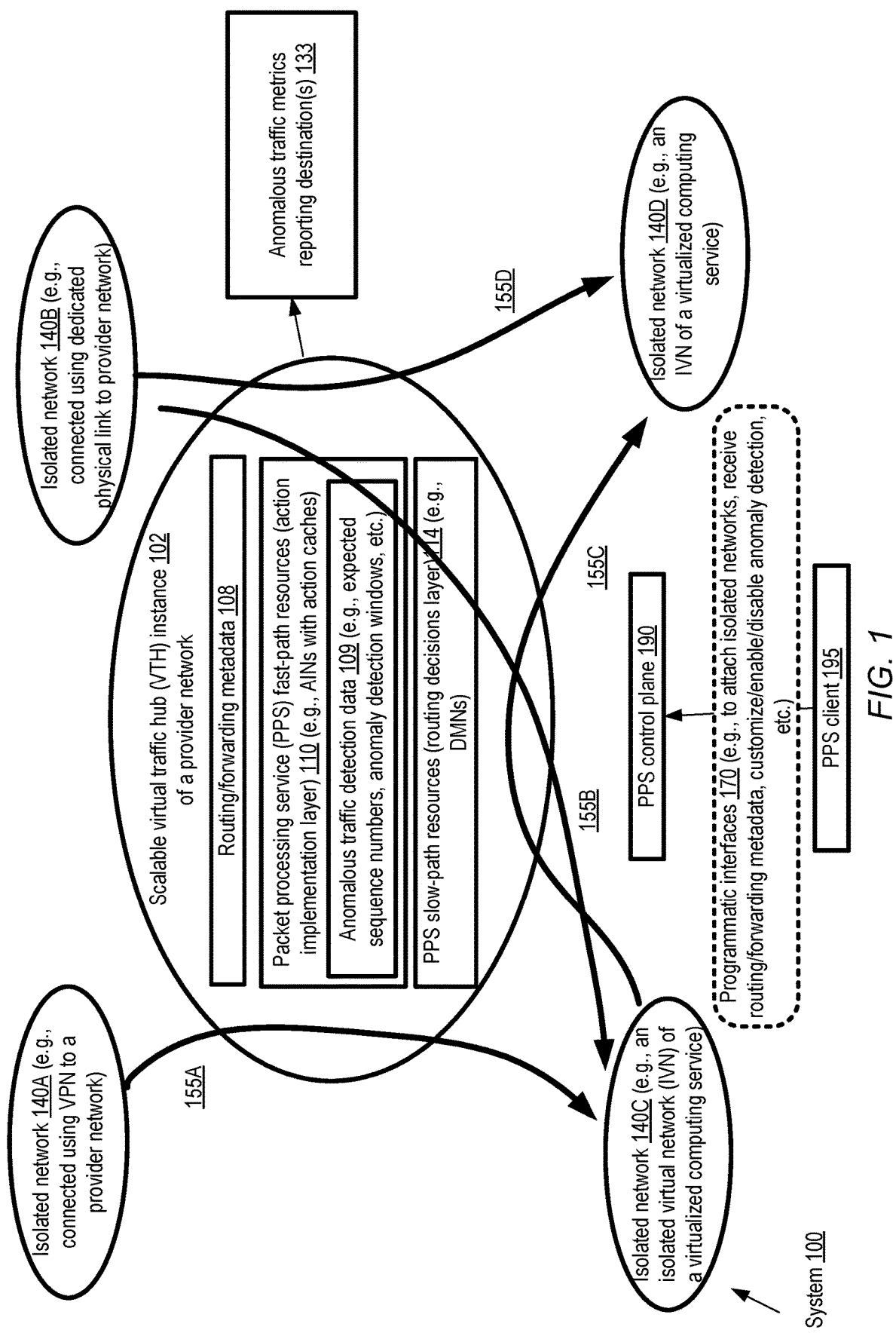
FIG. 1 illustrates an example system environment in which scalable virtual hubs of a packet processing service, set up to implement a variety of networking applications, may also be employed to detect anomalies in network traffic flows, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for detecting traffic flow anomalies at scalable virtual traffic hubs used as routing/forwarding intermediaries between isolated networks are described. A variety of categories of traffic anomalies such as packet losses, retransmissions, unexpected sequences of packet sizes, unexpected properties of packet contents, and the like may be detected at the virtual traffic hubs in various embodiments. The particular types of anomalies that are to be detected, the notification mechanisms to be used to report detected anomalies, and/or thresholds to be used to determine whether a particular metric or example of a detected anomaly is to be recorded or reported may be customized in various embodiments. In at least some embodiments, a multi-layer packet processing service (PPS) comprising a plurality of logically isolated cells may be used as the underlying framework for the virtual traffic hubs. Virtual traffic hubs (VTHs), as suggested by the name, may serve as hubs set up on behalf of respective customers or clients of a provider network, to which several different types of isolated networks may be programmatically attached in a hub-and-spoke configuration in various embodiments, such that the routing/forwarding of network packets from one attached isolated network to another is managed by nodes of a VTH based on metadata and/or policies provided by the customers. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. A provider network at which a PPS is implemented may comprise numerous data centers in various locations of cities, states and countries around the world in various embodiments.

The isolated networks attached to a VTH may, for example, include isolated virtual networks (IVNs) comprising virtual machines set up on behalf of the client using resources within data centers of the provider network, and/or networks set up at premises external to the provider network (e.g., at client-owned premises or client-managed data centers) and connected to the provider network via custom dedicated physical links or VPN (Virtual Private Network) tunnels in various embodiments. Such networks may be designated as "isolated" networks because, for example, at least some network configuration settings (e.g., network addresses assigned to resources within a given network, subnet configurations, security settings and the like) may be set independently for the different networks, without having to take other networks' configuration settings into account. For example, a range of private network addresses selected for resources within one isolated network may happen to overlap with a range of private network addresses selected for resources within another isolated network in various embodiments, since the two address ranges are selected independently. According to some embodiments, the metadata taken into consideration at a given VTH set up on behalf of a given client to manage traffic flowing between various isolated networks may include routing/forwarding rules provided by the client (and/or rules generated at the VTH based on other input provided by the client).

In some embodiments, a plurality of isolated networks may be programmatically attached to a VTH established on behalf of a client of a packet processing service. The VTH may include one or more action implementation nodes (AINs) at one or more computing devices (forming the action implementation layer of the VTH), and one or more decision master nodes (DMNs) at one or more computing devices (forming the decisions layer of the VTH). Individual ones of the AINs may implement one or more routing actions on network packets received at the VTH. The action(s) to be performed for a given network flow may be generated, using routing/forwarding metadata obtained at a DMN, and transmitted to an AIN, e.g., in response to an AIN-submitted request in various embodiments. In some embodiments, a given action generated at the DMN for a network flow and sent to an AIN may comprise executable instructions of a register-based virtual machine optimized for implementing network processing operations, and may therefore be executed very rapidly at the AIN. Network flows may be distinguished from one another in various embodiments based on some combination of properties of the packets of the flows, including for example source or destination network addresses, source or destination ports, the networking protocol being used, an identifier of a networking application for which the packets are being transmitted, and so on.

A determination may be made, at one or more nodes of the VTH, that anomaly metrics (such as anomalous packet sequence counts representing the number of times within some time interval that received packets did not have expected sequence numbers) are to be collected with respect to at least some network flows between one or more pairs of the attached isolated networks in some embodiments. A number of different approaches may be taken towards enabling anomaly metric detection at the VTH in different embodiments. For example, in one embodiment, settings at an AIN may be modified to require all flows using a set of network protocols (such as the Transmission Control Protocol (TCP), the Internet Control Message Protocol (ICMP), etc.) and handled by that AIN, to be monitored for anomalies, regardless of sources and destinations, and independently of the actions generated at the DMNs. In another embodiment, the set of metadata or rules provided by a client to enable the DMNs to generate actions may also include guidance regarding the types of anomalies to be detected, the specific flows (e.g., as identified by particular ranges of source addresses/ports or the like) for which anomalies are to be detected, and so on. In the latter scenario, the actions generated at the DMNs may include instructions to detect and/or report the anomalies. In at least some embodiments, clients of the packet processing service may be able to specify fairly sophisticated types of anomalies using the metadata. In some example scenarios, based on the application for which the VTH is being used as an intermediary, a client may expect that individual packets transmitted from a given set of sources at one isolated network and a given set of destinations at another isolated network should be between K and L bytes in length, or that the data payloads of individual packets of a given set of flows are to include one of a set of tokens {TokenSet}. Based on metadata provided to the VTH, actions which result in designating packets that do not meet such expectations as anomalous may be generated at the DMNs in various embodiments.

In at least some embodiments, in response to a determination that anomaly metrics are to be collected for a given flow or a set of flows, expected properties of packets of the flows (such as the next expected sequence numbers, expected packet size ranges, etc.) may be stored at AINs of the VTH. When a packet of a given flow is received, the AIN may perform at least two types of operations in such embodiments: (a) a routing/forwarding operation, resulting in transmission of at least some packets towards a destination indicated in the action being implemented for the received packet and (b) an anomaly analysis operation. The anomaly analysis operation may, for example, include comparing an expected property of the received packet with the corresponding actual property in at least some embodiments. For example, depending on the specific networking protocol being used for the flow, the AIN may store an expected sequence number $SN_{exp}$ for a given flow. If the actual sequence number of a received packet is not $SN_{exp}$, this may be considered an anomaly by the AIN; if the actual sequence number is SNexp, this may not be considered an anomaly. As individual packets of a flow are processed at the VTH, the expected properties for the flow may be updated in some cases—e.g., the expected sequence numbers for received packets may be increased as more packets of the flow are transmitted. Other expected properties (such as ranges of packet sizes) may remain fixed over the lifetime of a flow in at least some embodiments. In some embodiments, expected values of packet properties need not necessarily be stored at VTH nodes to detect anomalies—instead, for example, the actual properties of a sequence of received packets (e.g., a set of N packets constituting an "anomaly analysis window") may be analyzed relative to one another (and/or relative to historical trends observed in the properties) to determine whether an anomalous pattern of traffic has occurred. In at least one embodiment, one or more machine learning models may be used to detect one or more types of anomalies.

Indications of detected anomalies may be provided to one or more destinations (e.g., to a client device, and/or to control plane components of the packet processing service) either directly or indirectly from the VTH in various embodiments. A number of different types of actions may be triggered as a result of the detection of anomalies at the VTHs in various embodiments—e.g., sustained anomalous behavior may indicate a potential failure, bug, or excessive resource contention, resulting in remedial reconfiguration actions such as replacing or resetting a device being used along a path used for the flow, adding resources for the path, etc. Some anomalous behaviors may indicate potential security breaches, for which further analysis may be initiated, further network traffic may be temporarily halted for some set of sources, and so on. The virtual traffic hubs may already be collecting statistics on various flows (such as the total number of packets transmitted per flow) in some embodiments, so the additional collection of anomaly detection metrics may not represent a large overhead in such embodiments. Collecting anomaly metrics at the VTHs may be much more efficient in various embodiments than attempting to detect anomalous behavior at all the source/destination endpoints of traffic flows, the intermediary devices over which the packets flow, and so on.

As one skilled in the art will appreciate in light of this disclosure, certain embodiments may be capable of achieving various advantages, including some or all of the following: (a) enabling failures and errors to be detected efficiently and quickly, using a minimal amount of additional resources compared to those that would be used if anomaly detection were not performed at the VTHs, in large scale networking environments that potentially include millions of network flows, without requiring error metrics to be collected at individual endpoints of the flows, (b) improving overall levels of security for applications involving traffic flowing between isolated networks, (c) enhancing the user experience of system administrators and/or application owners by providing anomaly detection information at customizable levels of aggregation and/or (d) improving overall application performance by rapidly ramping up resources in response to detecting resource saturation events.

Example System Environment With Virtual Traffic Hubs Utilizing Multiple Route Tables FIG. 1 illustrates an example system environment in which scalable virtual hubs of a packet processing service, set up to implement a variety of networking applications, may also be employed to detect anomalies in network traffic flows, according to at least some embodiments. As shown, system 100 comprises an instance 102 of a virtual traffic hub at a provider network, set up using the resources of a multi-layer packet processing service in the depicted embodiment. The VTH instance 102 may be used to enable connectivity among a plurality of isolated networks 140A-140D. The packet processing service (PPS) may, for example, include an administrative or control plane 190, as well as a data plane comprising fast-path resources 110 and slow-path resources 114 in the depicted embodiment. The control plane may be responsible for configuring various VTH instances and associated routing/forwarding metadata 108 in the depicted embodiment, while the data plane resources may be used to generate and implement actions to route packets originating at (and directed to) the isolated networks 140. The fast path resources 110 may include a set of action implementation nodes (AINs) at which routing/forwarding actions determined at the slow path resources 114, and cached locally at the AINs, are performed in the depicted embodiment. The slow path resources 114 may include one or more decision master nodes (DMNs) in the depicted embodiment, responsible for using metadata or guidance supplied by clients of the PPS to generate executable actions for packets of various flows, and providing the actions to the AINs in response to queries from the AINs.

Connectivity among a number of different types of isolated networks 140 may be provided using a VTH instance 102 in the depicted embodiment. For example, isolated network 140A may comprise a set of resources at a data center or premise external to the provider network's own data centers, which may be linked to the provider network using VPN (virtual private network) tunnels or connections that utilize portions of the public Internet in the depicted embodiment. Isolated network 140B may also comprise resources at premises outside the provider network, connected to the provide network via dedicated physical links (which may be referred to as "direct connect" links) in the depicted embodiment. Isolated network 140C and 140D may comprise respective isolated virtual networks (IVNs) set up using resources located at the provider network's data centers in the depicted example scenario. An isolated virtual network may comprise a collection of networked resources (including, for example, virtual machines) allocated to a given client of the provider network, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for virtual machines may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. Similar flexibility may also apply to configuration settings at VPN-connected isolated networks such as 140A, and/or at isolated networks 140B connected via dedicated links to the provider network in the depicted embodiment.

In at least some embodiments, a PPS client 195 may provide at least a portion of the routing/forwarding metadata 108 of the VTH instance 102 which is used for generating the actions that are eventually used to route network packets among the isolated networks 140, e.g., using one or more programmatic interfaces 170 of the PPS control plane 190. Interfaces 170 may include, for example, one or more web-based consoles, a set of application programming interfaces (APIs), command line tools, graphical user interfaces and the like in different embodiments. In at least one embodiment, a client may use programmatic interfaces 170 to issue requests to enable or disable the detection of anomalous traffic flows, to customize the type of anomaly detection to be performed, and so on. A given isolated network 140 may be programmatically attached to, or associated with, a particular VTH instance 102, in response to a programmatic request submitted via interfaces 170 in the depicted embodiment. In general, any desired combination of unidirectional or bi-directional traffic, as well as anomaly detection for such traffic, between a given pair of isolated networks may be enabled by using the appropriate combination of programmatic interactions in various embodiments. A wide variety of hub-and-spoke configurations in which anomalous traffic patterns are detected automatically, with isolated networks as the spokes and the VTH instance 102 as a hub, may thereby be supported in different embodiments.

According to at least some embodiments, a determination may be made that anomaly metrics of traffic of at least some network flows between at least some pairs of isolated networks 140 attached to or associated with the VTH instance 102 are to be collected. Accordingly, a set of anomalous traffic detection data 109 may be stored at one or more layers of the VTH instance 102, e.g., at the action implementation layer. The particular type of data 109 that is to be used to detect and/or report anomalous traffic may differ in various embodiments for different clients or isolated network combinations—e.g., in some cases expected sequence numbers of received packets may be stored, in other cases information about expected sizes or patterns of sizes of received packets may be stored, and so on. In at least some embodiments, some indication of the expected properties of packets to be received, e.g., for individual flows, may be propagated to and stored at one or more layers of the VTH as part of the anomalous traffic detection data set 109. In other embodiments, instead of or in addition to storing expected values of one or more packet properties, other types of metadata that may be used to detect anomalies, such as the number of successive packets (which may be referred to as an anomaly analysis window size) for which values of a particular property are to be analyzed may be stored in data set 109.

After the routing/forwarding metadata 108 has been obtained at the VTH instance 102, network packets may be accepted at the fast-path resources 110 from various resources within the different isolated networks 140 in the depicted embodiment. When a packet is received at an AIN, that AIN may attempt to find (e.g., using a key based on various properties of the packet's "flow", including for example the combination of source and destination IP addresses and ports) a matching action in its action cache in various embodiments. If an action is not found in the cache, the slow path resources 114 (e.g., one or more decision master nodes of the VTH instance) may be consulted by the AIN. A DMN may look for a previously-generated action appropriate for the received packet in its own cache in some embodiments. If a pre-generated action is found, it may be provided to the AIN for caching and implementation. If no such action is found by the DMN, a new action may be generated, e.g., using the routing/forwarding metadata (e.g., including forwarding information base or FIB entries, route tables, etc.) corresponding to the source and/or destination isolated networks of the packet in the depicted embodiment. An executable version of the action (e.g., in byte code expressed using instructions of a register-based virtual machine optimized for implementing network processing operations) may be generated, optionally cached at the decisions layer, and provided to the AIN, where it may be implemented for the current packet (and cached and re-used for subsequent packets of the same flow) in various embodiments.

In at least some embodiments, if anomaly detection has been enabled for a particular flow, the AINs may also compare one or more expected properties of a packet (as indicated for example in data 109) with the corresponding actual properties of the received packet, and use the results of such a comparison to determine whether the received packet represents an anomaly. Thus, in such embodiments, AINs may perform at least two types of operations: routing/forwarding of received packets (or transformed versions of received packets, depending on the requirements of the client), as well as anomaly detection operations. In some embodiments, anomalies may be defined and/or detected for a group of packets rather than for individual packets—e.g., before determining that an anomalous event has occurred, the properties of several packets of a given flow may be compared with corresponding expected properties. As mentioned above, in at least some embodiments anomalies may be detected based on analysis of actual values of packet properties, and expected values of those properties may not necessarily have to be stored. If and when an anomaly is detected, the VTH may transmit or provide an indication of the detected anomaly (e.g., a detected anomalous sequencing of packets, or a detected unexpected packet size) to one or more destinations 133 in the depicted embodiment. The mechanism to be used to provide the indication (e.g., whether email is to be used, a short message service (SMS) message is to be used, an alert is to be raised via some interface, etc.) may be customized by clients of the PPS and/or by administrators of the PPS in different embodiments.

Thresholds may be defined for reporting anomalous traffic in some embodiments—e.g., a client 195 may specify (using programmatic interfaces 170) that a report of an anomaly is only to be transmitted to a destination 133 if more than X packets with unexpected sequence numbers are detected within a given time period or a given sequence of S packets, and so on. In at least some embodiments, detected anomalies may be reported or presented at various destinations 133 in the form of time series representation of values: e.g., the number of out-of-sequence or dropped packets per T milliseconds may be presented for some number of T millisecond periods. In one embodiment, detected anomalies may trigger automated configuration changes at one or more layers of the packet processing service (or the provider network at which the PPS is implemented)—e.g., AINs or DMNs may be added to VTH 102, the amount of memory allocated to AINs/DMNs may be increased, higher-bandwidth network links may be activated for the traffic associated with one or more isolated networks 140, and so on.

In some embodiments, nodes at more than one layer of a VTH instance 102 may participate in detecting anomalies: e.g., executable actions generated at the DMNs of the slow-path resources layer 114 may include the logic to be used to detect and/or report anomalies, and the AINs of the fast-path resources layer 110 may implement that logic. In at least one embodiment, indications of discrepancies between expected and actual properties of received packets may be passed to the DMNs from the AINs, decisions as to whether the discrepancies constitute reportable anomalies may be made by the DMNs, and the DMNs may transmit the indications of reportable anomalies to the destinations 133.

In at least some embodiments, machine learning models trained to analyze information about packet sequences may be used to help identify patterns of anomalous traffic flowing through the VTH 102—e.g., raw data about actual properties of received packets may be provided as input to the models, and the output of the models may help to indicate whether actionable anomalies have occurred.

In various embodiments, network packets of a variety of protocols (including the Internet Protocol (IP), the Transmission Control Protocol (TCP), the User Datagram Protocol (UDP), the Internet Control Message Protocol (ICMP), protocols that do not belong to or rely on the TCP/IP suite of protocols, etc.) may be processed at a given VTH instance 102. In some embodiments, the decision as to whether anomaly metrics are to be collected for a given flow may be based simply on the networking protocol in use for the flow—e.g., flows using protocols whose packet headers include sequence numbers, such as TCP and ICMP, may be automatically or by default monitored for anomalies at the VTH 102. In other embodiments, clients of the PPS may indicate, via a programmatic request, a subset of flows (e.g., based on addresses or port numbers) for which anomaly detection is to be performed. In various embodiments, a given flow for which an action is generated may be characterized (or distinguished from other flows) based on one or all of the following attributes or elements of packets received at the packet processing service (PPS): the network protocol used for sending the packet to the PPS, the source network address, the source port, the destination network address, the destination port, an identifier of a source or destination isolated network, and/or an application identifier (e.g., an identifier of a specific virtual network interface set up for communications between an isolated network and the PPS). In some embodiments the direction in which the packets are transmitted (e.g., towards the PPS, or away from the PPS) may also be included as an identifying element for the flow.

Cell-based Packet Processing Service

Figure 2:
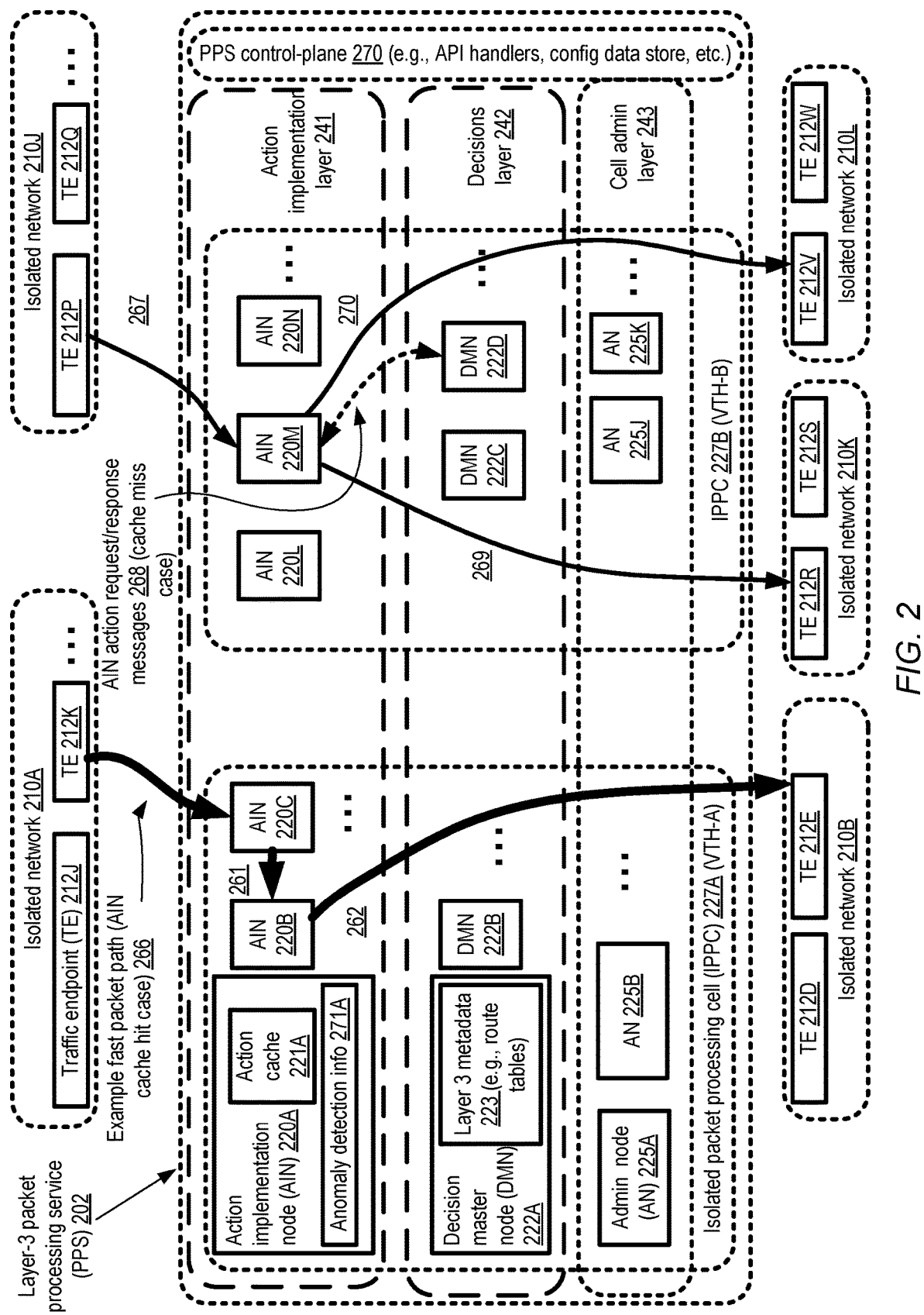
FIG. 2 illustrates an overview of a multi-layer cell-based packet processing service which may be used to establish virtual traffic hubs, according to at least some embodiments.

FIG. 2 illustrates an overview of a multi-layer cell-based packet processing service which may be used to establish virtual traffic hubs, according to at least some embodiments. As shown, a layer-3 packet processing service (PPS) 202 may comprise an action implementation layer 242, a decisions layer 242 and a cell administration layer 243, as well as a set of service-level control-plane resources 270 including API handlers, metadata stores/repositories and the like in the depicted embodiment. Individual ones of the layers 241, 242 and 243 may comprise a plurality of nodes, such as action implementation nodes (AINs) at layer 241, decision master nodes (DMNs) at layer 242, and administration nodes (ANs) at layer 243. Resources of layers 241, 242, and 243 may be organized into groups called isolated packet processing cells (IPPCs) 227 (e.g., 227A or 227B) in various embodiments, with a given IPPC 227 comprising some number of AINs, some number of DMNs, and some number of ANs. For example, IPPC 227A may include AINs 220A, 220B and 220C, DMNs 222A and 222B, and ANs 225A and 225B in the depicted embodiment, while IPPC 227B may comprise AINs 220L, 220M and 220N, DMNs 222C and 222D, and ANs 225J and 225K. Individual nodes such as AINs, DMNs and/or ANs may be implemented using some combination of software and hardware at one or more computing devices in different embodiments—e.g., in some embodiments, a given AIN, DMN or AN may comprise a virtual machine running at a host managed by a virtualized computing service of a provider network, while in other embodiments AINs, DMNs and/or ANs may be implemented using non-virtualized servers.

The resources of the packet processing service 202 may serve as an infrastructure or framework that can be used to build, and detect anomalies in the traffic patterns of, a variety of networking applications using virtual traffic hubs, such as applications for forwarding/routing packets between isolated networks, applications for multicasting packets, virtual private networking applications and the like in different embodiments. Individual IPPCs 227 may be assigned to implement the logic of one or more instances of such an application in some embodiments, with the traffic associated with that application being processed (at least under normal operating conditions) and analyzed for anomalies without crossing IPPC boundaries. For example, in the depicted embodiment, IPPC 227A may have been assigned to an instance of a VTH (VTH-A) for transmitting packets between at least isolated network 210A and isolated network 210B, while IPPC 227B may have been assigned to another VTH instance (VTH-B) for transmitting packets between at least isolated network 210J and 210K. Individual ones of the isolated networks 210 may have associated private IP address ranges, such that addresses assigned to resources within a given isolated network 210 may not be visible to resources outside the isolated network, and such that at least by default (e.g., prior to the assignment of an IPPC implementing a virtual routing application), a pathway between resources within different isolated networks may not necessarily be available.

In various embodiments, instances of networking applications, such as virtual traffic hubs VTH-A and VTH-B that perform routing between isolated networks 210, may be set up in response to programmatic requests received from customers of the PPS 202. Such requests may, for example, be received at API handlers of the PPS control-plane 270. In response to a client's request or requests to enable virtualized routing via a hub between isolated networks 210A and 210B, for example, VTH-A built using IPCC 227A may be assigned to forward packets among the two isolated networks in the depicted embodiment. Similarly, in response to another client's request (or the same client's request) to enable multicast connectivity among isolated networks 210J, 210K and 210L, IPPC 227B may be assigned. Anomaly detection may be enabled for various applications, e.g., by default or in response to programmatic requests from the clients in different embodiments. In scenarios in which anomaly detection is enabled, anomaly detection information 271 (e.g., information 271A at AIN 220A) may be stored at one or more layers of the VTHs, indicating for example expected packet properties with which actual packet properties may be compared to help detect anomalies and/or anomaly detection window sizes.

In at least some embodiments, a collection of virtual network interfaces may be programmatically configured to enable traffic to flow between endpoints (TEs 212, such as 212D, 212E, 212J, 212K, 212P, 212Q, 212R, 212S, 212V and 212W) in the isolated networks and the AINs of the cell assigned to those isolated networks. Clients on whose behalf the networking applications are being configured may provide decision metadata (e.g., layer 3 metadata 223 such as forwarding information base entries, route table entries and the like) and/or policies that can be used to determine the packet processing actions that are to be performed via control plane programmatic interfaces of the PPS in some embodiments. The metadata received from the clients may be propagated to the decision manager nodes of the appropriate IPPCs 227, e.g., from the PPS API handlers via the ANs 225 or directly in the depicted embodiment. In at least some embodiments, the metadata initially provided by the clients may be transformed, e.g., by converting high-level information into more specific route table entries that take into account the identifiers of virtual network interfaces to be used, locality-related information, information about the availability containers in which various AINs are configured, and so on, and the transformed versions may be stored at the different DMNs 222. In some embodiments, the metadata provided by the clients may also include anomaly detection guidance—e.g., which specific flows are to be analyzed for anomalies, how the anomalies are defined, how/where the anomalies should be reported, and so on.

A given packet from a source endpoint such as TE 212K of isolated network 210A may be received at a particular AIN such as 220C in the depicted embodiment. The specific AIN to be used may be selected based, for example, on a shuffle-sharding algorithm in some embodiments, such that packets of a particular flow from a particular endpoint are directed to one of a subset of the AINs of the cell. Individual ones of the AINs may comprise or have access to a respective action cache, such as action cache 221A. An action cache may be indexed by a combination of attributes of the received packets, such as the combination of an identifier of the sending client, the source and destination IP addresses, the source and destination ports, and so on. Actions may be stored in executable form in the caches in some embodiments, e.g., using byte code expressed using instructions of a register-based virtual machine optimized for implementing network processing operations. AIN 220C may try to look up a representation of an action for the received packet in its cache. If such an action is found, the packet may be processed using a "fast path" 266 in the depicted embodiment. For example, an executable version of the action may be implemented at AIN 220C, resulting in the transmission of the contents of the packet on a path towards one or more destination endpoints, such as TE 212E in isolated network 210B. The path may include zero or more additional AINs—e.g., as shown using arrows 261 and 262, the contents of the packet may be transmitted via AIN 220B to TE 212E in the depicted fast packet path. AIN 220B may have a virtual network interface configured to access TE 212E, for example, while AIN 220C may not have such a virtual network interface configured, thus resulting in the transmission of the packet's contents via AIN 220B. Note that at least in some embodiments, one or more header values of the packet may be modified by the action (e.g., in scenarios in which overlapping private address ranges happen to be used at the source and destination isolated networks)—that is, the packet eventually received at the destination endpoint 212E may differ in one or more header values from the packet submitted from the source endpoint 212K.

If an AIN's local action cache does not contain an action for a received packet, a somewhat longer workflow may ensue. Thus, for example, if a packet is received from TE 212P at AIN 220M (as indicated via arrow 267), and a cache miss occurs in AIN 220M's local cache when a lookup is attempted for the received packet, AIN 220M may send an action query to a selected DMN (DMN 222D) in its IPCC 227B, as indicated by arrow 268. The DMN 222D may determine, e.g., based on a client-supplied policy indicating that a multicast operation is to be performed, and based on forwarding/routing metadata provided by the client, that the contents of the packet are to be transmitted to a pair of endpoints 212R and 212V in isolated networks 210K and 210L respectively in the depicted example. A representation of an action that accomplishes such a multicasting operation may be sent back to AIN 220M, stored in its local cache, and executed at AIN 220M, resulting in the transmissions illustrated by arrows 269 and 270. In this example, AIN 220M can send outbound packets directly to the destination TEs 212R and 1212V, and may not need to use a path that includes other AINs of IPCC 227B.

As the traffic associated with the applications flows via the IPCCs 227, their respective ANs may collect various types of metrics, including for example anomaly metrics (e.g., metrics indicating dropped packets, retransmitted packets, etc.). Based at least partly on some or all of the metrics, as and when needed, additional AINs, DMNs (or even ANs) may be instantiated in various embodiments. At least in some embodiments, different IPCCs may have differing initial configurations—e.g., some IPCCs may start out with 10 AINs and 3 DMNs, others with 20 AINs and 7 DMNs, and so on. If the total workload being handled by the current set of IPCCs exceeds a threshold, new IPCCs may be instantiated and assigned to new application instances or VTHs (or, via application migration, to existing application instances or VTHs) in some embodiments. Similarly, if the overall workload falls below a threshold, or the resource utilization metrics of one or more IPCCs falls below some threshold, selected IPPCs (or individual nodes within selected IPPCs) may be decommissioned in various embodiments. Some application instances may potentially generate more traffic than can be handled by the maximum capacity that be provisioned by a given IPCC—in such scenarios, multiple IPCCs may be used in at least one embodiment for a given application instance.

A given IPPC 227 of the PPS 202 may be referred to in some embodiments as being "isolated" because, at least during normal operating conditions, no data plane network traffic may be expected to flow from that cell to any other cell of the service as indicated earlier. In at least one embodiment, control plane traffic may also not flow across cell boundaries under normal operating conditions. As a result of such isolation, a number of benefits may be obtained: e.g., (a) an increase in a workload of one instance of a packet processing application, being implemented using one cell, may have no impact on the resources being used for other applications at other cells, and (b) in the rare event that a failure occurs within a given cell, that failure may not be expected to have any impact on applications to which other cells have been assigned. Software updates may be applied to nodes of one cell at a time, so any bugs potentially introduced from such updates may not affect applications using other cells. The specific type of packet processing being performed (and/or the types of anomaly detections being performed) may vary from one application to another, and as a result from one IPPC 227 to another in at least some embodiments. In some embodiments, while at least one IIPC may be assigned to a given VTH instance, a given IPPC 227 may potentially be employed in a multi-tenant mode for multiple VTHs configured on behalf of multiple customers. In at least some embodiments, nodes of the packet processing service cells may generate and run highly efficient executable actions to implement the application-specific packet processing logic based on customer-supplied policies, e.g., using a virtual machine instruction set optimized for networking-related operations.

In at least some embodiments, a shuffle sharding algorithm may be used to assign a subset of nodes (e.g., AINs) of an IPPC 227 to a given set of one or more source or destination endpoints of a given application. According to such an algorithm, if the IPPC comprises N AINs, packets from a given source endpoint E1 may be directed (e.g., based on hashing of packet header values) to one of a subset S1 of K AINs (K<N), and packets from another source endpoint E2 may be directed to another subset S2 of K AINs, where the maximum overlap among S1 and S2 is limited to L common AINs. Similar parameters may be used for connectivity for outbound packets to destination endpoints from the packet processing service in various embodiments. Such shuffle sharding techniques may combine the advantages of hashing based load balancing with higher availability for the traffic of individual ones of the source and destination endpoints in at least some embodiments.

Potential Causes of Traffic Anomalies

In various embodiments, the isolated networks connected via VTHs may each comprise large numbers (e.g., thousands) of devices sending and receiving network packets, some over pathways that lie entirely within a provider network, other pathways that use resources of the public Internet, service providers external to the provider network, and so on. In at least some embodiments, the number of devices and network links involved in the traffic of a complex application being managed using a VTH may be so large that it is impractical to attempt to detect traffic anomalies at individual ones of all the devices/links; many of the devices involved may be used in multi-tenant mode, hard to instrument, and/or the overhead required for detecting anomalies at the devices may be too high. Because a VTH may act as an intermediary for all the traffic flowing between a given pair of isolated networks, and because flow-level statistics (such as packet transmission rates) may already be gathered as part of a VTH's core functions, it may be more efficient to use the VTH to detect anomalies at the VTH in at least some embodiments.

Figure 3:
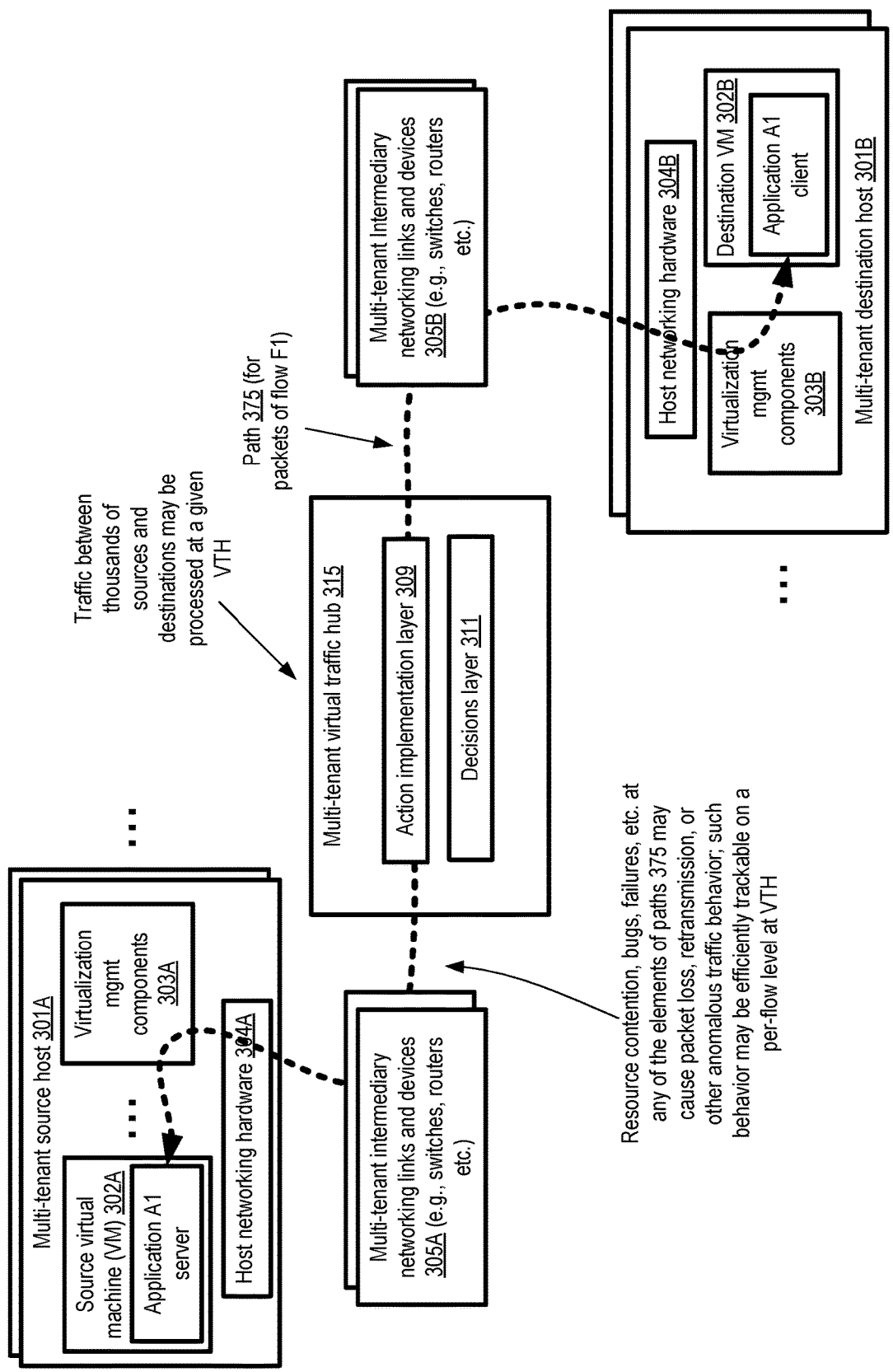
FIG. 3 illustrates examples of entities, along an example path taken by network packets processed at virtual traffic hubs, at which packet flow anomalies may potentially be caused, according to at least some embodiments.

FIG. 3 illustrates examples of entities, along an example path taken by network packets processed at virtual traffic hubs, at which packet flow anomalies may potentially be caused, according to at least some embodiments. In the depicted embodiment, traffic from a server portion of an application A1, running at a source virtual machine (VM) 302A in one isolated network (e.g., an isolated virtual network of the kind described above) may be transmitted via a virtual traffic hub 315 to a client portion of the application A1 at a destination VM 302B at a different isolated network. A given packet, generated at the application A1 server, may pass through various layers of the operating system in use at the source VM 302A, as well as one or more virtualization management components 303A (e.g., components of a hypervisor), before it reaches the host networking hardware 304A of the source host 301A in the depicted embodiment. The source host 301A may be configured in multi-tenant mode in some embodiments, so that several different virtual machines being used for respective applications or for different clients may be instantiated at the host 301, and all these VMs may use the virtualization management components 303A and the host networking hardware 304A.

After the packet (which may be transformed based on an encapsulation protocol, e.g., at the virtualization management components 303A) exits the source host 301A, it may pass through a number of potentially multi-tenant intermediary networking links and devices 305A (e.g., switches, routers, gateways, etc.) before it reaches the VTH 315 in the depicted embodiment. At the VTH, the packet may be processed at one or nodes of the action implementation layer 309, e.g., in accordance with actions generated at the decisions layer 311. One or more packets corresponding to the packet received at the VTH 315 may then be transmitted, via another set of potentially multi-tenant intermediary links and devices 305B, to a potentially multi-tenant destination host 305B. There, the packet may pass through host networking hardware 304B, virtualization management component5s 303B, and various layers of the software stack of destination VM 302B, before reaching the destination client portion of application A1 in the depicted embodiment.

The path 375 taken by packets of a given flow F1 may thus include a large number of software and entities, at any of which various problems that could lead to anomalous traffic patterns may arise. For example, the workload levels at various devices (including the devices of the VTH 315 itself) and links along the path may vary over time, and it may be the case that some resources are over-utilized during some time intervals resulting in potential dropping of packets. Given the multi-tenant modes of operation of various ones of the devices and links along the paths 375, it may be especially hard to detect anomalous traffic patterns at the devices and/or links. At least some of the devices and/or links (e.g., network switches, hardware routers and the like) may not be designed to detect anomalies, and it may be hard to modify such devices to do so in various embodiments. In contrast, the VTH 315 may be designed to collect at least some statistics on a per-flow basis, so it may not represent much additional overhead to add the collection of anomaly metrics in at least some embodiments to the operations being performed at the VTH. The VTHs may be engineered to scale as the traffic workload increases, and so may be able to efficiently collect anomaly metrics for packet flows of thousands of sources and destinations in at least some embodiments. Such anomalies may be caused, for example, by excessive resource contention, bugs, temporary or permanent failures at any of the elements of paths 375 for any of the flows being processed at the VTH in the depicted embodiment. Of course, while it may be possible to detect anomalous traffic at the VTHs, identifying the root cause of the anomalies may require additional analysis in at least some embodiments; however, such root cause analysis may at least in some cases be triggered automatically (and as soon as anomalies are detected) by using the VTH's anomaly detection functionality.

Flow-indexed Storage of Anomaly Information

Figure 4:
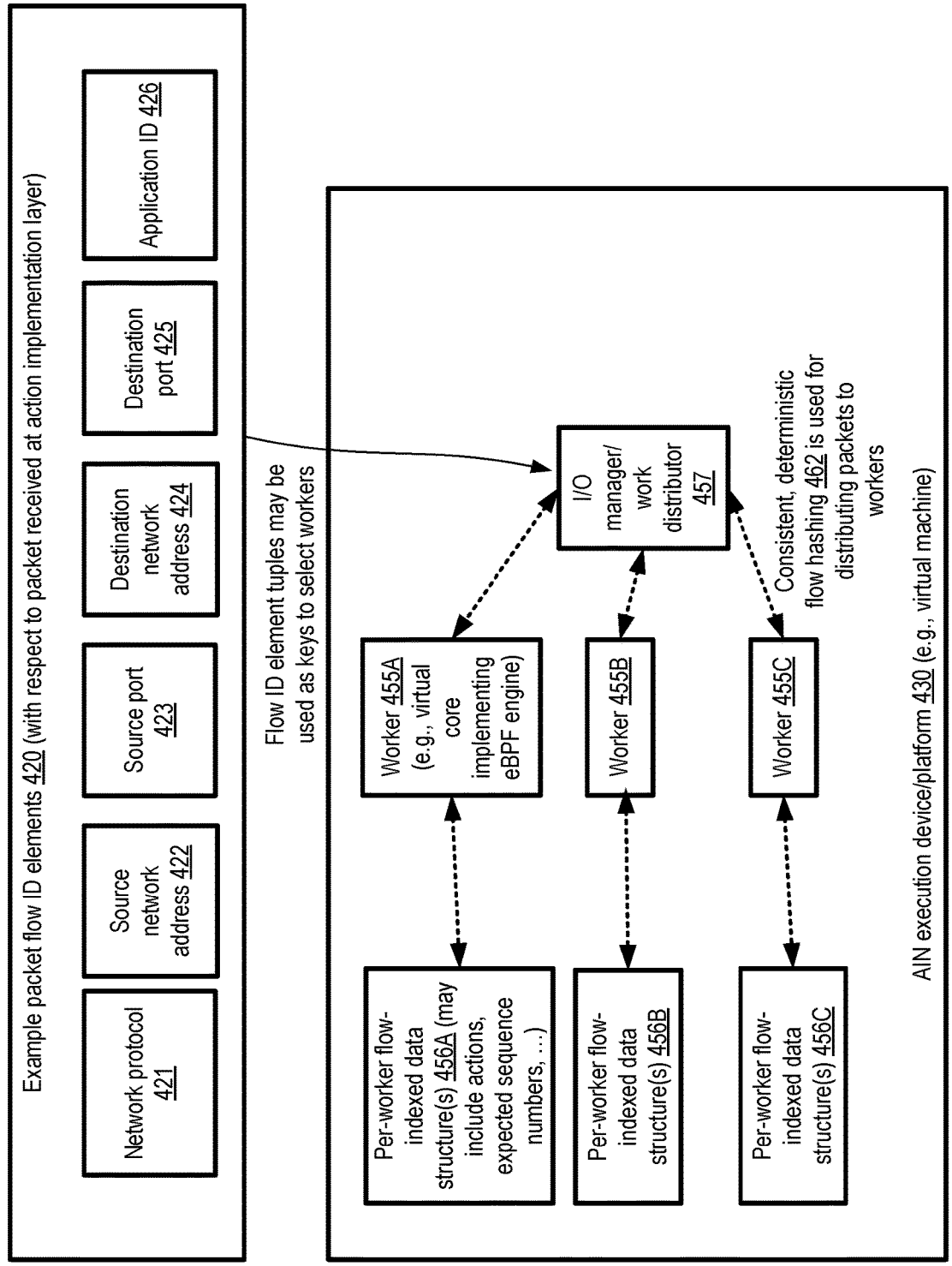
FIG. 4 illustrates example flow identifier elements which may collectively be used as keys for distributing workloads and storing anomaly detection information at an action implementation node of a virtual traffic hub, according to at least some embodiments.

In at least some embodiments, as mentioned earlier, anomalies in traffic of various network flows may be detected at the action implementation layer of a virtual traffic hub. FIG. 4 illustrates example flow identifier elements which may collectively be used as keys for distributing workloads and storing anomaly detection information at an action implementation node of a virtual traffic hub, according to at least some embodiments. A flow may be characterized (or distinguished from other flows) based on one or all of the following attributes or elements 420 of packets received at the packet processing service in the depicted embodiment: the network protocol 421 used for sending the packet to the PPS, the source network address 422, the source port 423, the destination network address 424, the destination port 425, and/or an application identifier 426. In some embodiments the direction in which the packets are transmitted (e.g., towards the PPS, or away from the PPS) may also be included as an identifying element for the flow. In one embodiment, identifiers of the source and/or destination isolated networks may also be used to identify a given flow. The particular combination of attributes that are used to distinguish one group of packets from another for a given packet processing application requirement or client may be referred to collectively as packet flow identifier elements 420 in some embodiments. The process of selecting a particular node or cell from among the accessible nodes/cells of the action implementation layer may include flow hashing (e.g., in addition to or instead of shuffle sharding) in some embodiments. Some or all of the packet flow identifier elements 420 of a given packet may be aggregated (e.g., via concatenation or using some other function) in some implementations, and the result of the aggregation may be provided as input to a selected hash function, with the output of the hash function used to select the particular node or cell as part of the flow hashing.

In the depicted embodiment, an AIN execution device or platform 430 may comprise a virtual machine implemented at a virtualized computing service of a provider network. The action implementation node itself may comprise an I/O manager 427 and one or more workers 425 (e.g., 425A, 425B or 425C) in the depicted embodiment. The I/O manager 427 may be referred to as a work distributor in at least some embodiments, as it may be responsible for receiving packets directed to the AIN and directing a given packet to a particular worker 425 for processing. The worker may be selected for example using a consistent, deterministic flow hashing algorithm 462 applied to a flow identifier associated with the packet. Input to the flow hashing algorithm may include one or more flow identification elements 420 in the depicted embodiment. The deterministic flow hashing may represent one example of deterministic mapping functions that may be used to select workers 425 for a given packet or flow in different embodiments. In at least some embodiments, individual ones of the workers 425 and/or the I/O manager 427 may comprise one or more virtual cores or threads. In at least some embodiments, a worker 425 may comprise an execution engine for programs expressed in an instruction set of an in-kernel register-based virtual machine optimized for network processing similar to eBPF. In other embodiments, such virtual machine instruction set execution engines may not be employed. In some embodiments, each worker 425 may instantiate and/or use one or more associated per-worker flow-indexed data structures 456 (e.g., 456A-456C), including, for example an action cache, within which representations of executable actions generated at the decision master nodes may be stored. When a packet is received at a worker 425 from the I/O manager, the action for it may be looked up in the corresponding cache, and performed if a cache hit occurs. If the action is not in the cache, the worker may indicate to the I/O manager that a cache miss occurred, and an action query may be sent from the I/O manager to a decision master node in at least some embodiments. In various embodiments, entries may be removed or evicted from the action caches based on various factors, such as usage timing records that indicate that a given action has not been performed for some threshold amount of time. In at least some embodiments, locks or other concurrency control mechanisms may not be required to access the individual caches, and/or to store/evict cache entries, e.g., because only a single worker may be expected to access entries associated with a given flow when deterministic mapping techniques of the kind discussed above are used to select workers for handling flows. In at least some embodiments, per-worker flow-indexed data structure(s) 456 may also be used to store anomaly-related data—e.g., including expected properties of to-be-received packets, detected anomalous event counts, and so on.

As suggested by its name, the I/O manager 427 may be responsible for data plane input/output operations of the workers 425 in the depicted embodiment—e.g., the I/O manager may act as an intermediary for messages between an individual worker 425 and other entities (including other AINs, DMNs, anomaly indication destinations and the like). In at least some embodiments, a given worker 425 may not have to communicate directly with other workers at the device 430; instead, all communications to/from a worker may flow through the I/O manager. In some embodiments, the workers and the I/O manager may be implemented as part of the same program or application, e.g., a program implemented using the Data Plane Development Kit or DPDK.

Aggregated Anomaly Metrics For Pairs of Isolated Networks

Figure 5:
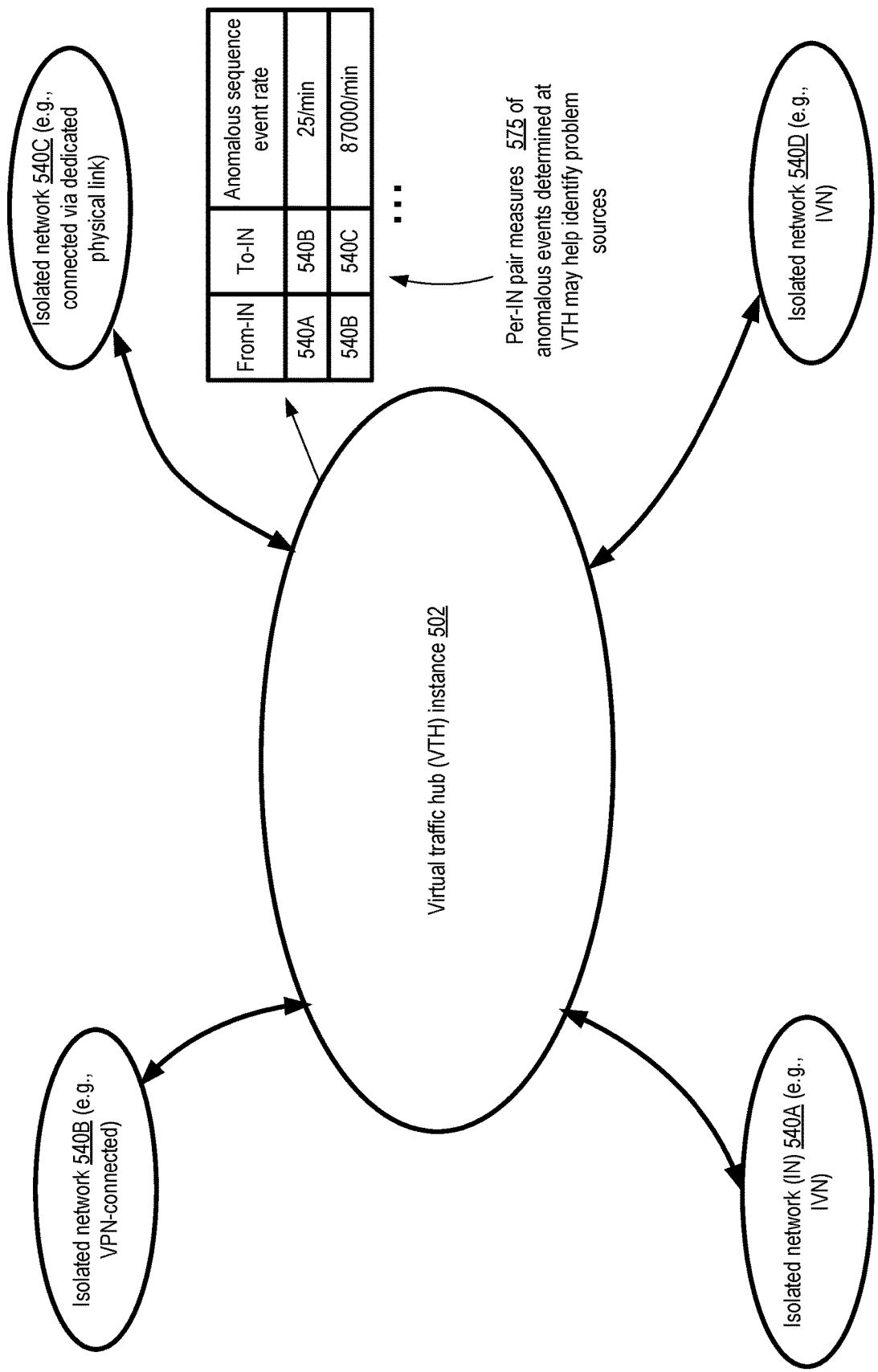
FIG. 5 illustrates an example of aggregation of traffic anomaly information for pairs of isolated networks attached to a virtual traffic hub, according to at least some embodiments.

FIG. 5 illustrates an example of aggregation of traffic anomaly information for pairs of isolated networks attached to a virtual traffic hub, according to at least some embodiments. In the depicted embodiment, at least four isolated networks (INs) 540A-540D may be programmatically attached, e.g., on behalf of one or more clients, to an instance of a virtual traffic hub 502 similar to the VTHs introduced earlier. INs 540A and 540B may, for example, comprise respective isolated virtual networks of a virtualized computing service of a provider network. IN 540B may comprise a network set up at premises of a client of the provider network, and connected to the provider network via a VPN tunnel, while IN 540C may comprise another client-premise network, connected to the provider network via a dedicated physical link of the kind discussed earlier.

The VTH instance 502 may be responsible for routing network traffic, and/or performing other types of packet processing operations, between various pairs of isolated networks 540 in the depicted embodiment. Information about expected properties of received packets for network flows originating/terminating at various one of the isolated networks may be stored at one or more layers of the VTH 502, and compared to the actual properties of the received packets to identify examples of anomalous traffic as discussed earlier in various embodiments. In at least some embodiments, instead of or in addition to providing indications of individual anomalies of various flows, anomaly information may be aggregated at various granularity levels, e.g., either at the VTH itself or at one of the destinations to which the indications of the anomalies are provided from the VTH. For example, in the depicted embodiment, per-IN pair measures 575 of anomalous packets sequence events may be generated and stored, and such measures may be used to help identify potential sources of networking problems. In the example shown, an anomalous packet sequence event rate for some recent time interval may be stored for each direction of traffic between various pairs of INs (e.g., respective measures may be determined for traffic from IN 540A to IN 540B, from IN 540B to IN 540A, from IN 540B to IN 540C, from 540C to 540B, and so on). Other types of anomaly metrics may be collected and aggregated in different embodiments.

The aggregated metrics may be provided, e.g., to the client on whose behalf the VTH instance 502 is established, administrators of the packet processing service, and/or to automated analysis systems used for detecting and responding to failures, over-utilization of resources and so on. In at least one embodiment, for example, a technique involving the process of elimination may be used together with the aggregated metrics 575 to narrow down links or devices that may be causing anomalies in the traffic. For example, if the rate at which anomalies are detected for traffic directed to IN 540C from several of the isolated networks 540 is high, while the rate of anomalies among traffic of other pairs of isolated networks is relatively low, this may indicate some problem in a network device along the path between the VTH and IN 540C in the depicted embodiment. Note that because the VTH 502 acts as the common intermediary for inter-isolated network traffic, this may simplify the task of aggregation of anomaly metrics in various embodiments.

Enabling Anomaly Detection

Figure 6:
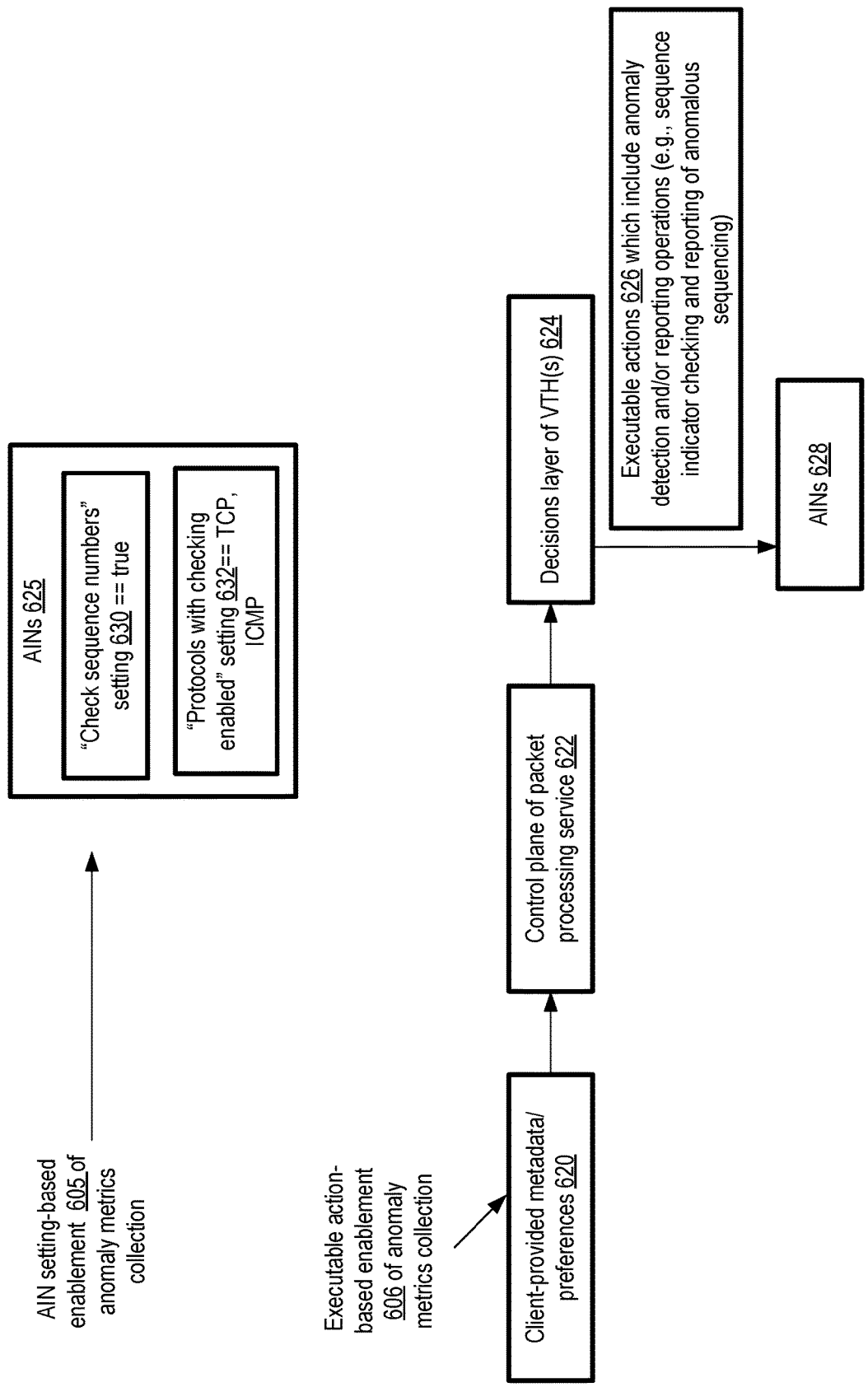
FIG. 6 illustrates example techniques for enabling anomaly metrics detection at a virtual traffic hub, according to at least some embodiments.

FIG. 6 illustrates example techniques for enabling anomaly metrics detection at a virtual traffic hub, according to at least some embodiments. In some embodiments, a configuration setting of an AIN may be used to enable anomaly detection at the AIN, e.g., instead of encoding the logic of anomaly detection within specific flow-level actions generated at the decisions layer of the VTH. As shown, in the AIN setting-based enablement approach 605, a setting 630 such as "check sequence numbers" may be set to "true" at various AINs 625 of a VTH in some embodiments. In at least one embodiment, additional settings such as "protocols with checking enabled" 630 may also be used, e.g., to indicate that packets transmitted using the TCP and ICMP protocols should be checked for anomalous sequence numbers. Based on the example settings shown in FIG. 6, the AIN 625 may perform sequence-number based anomaly detection for all received TCP and ICMP packets of all flows that are directed to the AIN in some embodiments, regardless of the specific routing/forwarding or other packet processing actions that may also be performed at the AIN. Note that a setting for detecting anomalous sequence numbers is just one example of AIN-level settings that may be used to enable/disable anomaly detection in different embodiments; other AIN-level settings may be used for example to detect anomalous packet sizes, anomalous packet contents etc.

In other embodiments, at least some anomaly detection and/or reporting tasks may be incorporated within executable actions generated at the decisions layer of the VTH and transmitted from the decisions layer to the AINs for implementation. In this action-based approach 606, a client of the packet processing service may include, in the form of metadata and/or preferences 620 provided to the control plane 622 of the packet processing service in various embodiments, guidance about the kinds of anomaly detection to be performed, the specific flows for which it is to be performed (indicates for example using source or destination addresses, or source/destination ports for which anomaly detection is requested), etc. The information regarding anomaly detection preferences of the client may be passed on from the control plane to decision master nodes at the decisions layer 624 of the VTHs set up for the client in at least some embodiments. At the decision master nodes, the executable actions 626 generated may include the desired anomaly detection and/or reporting operations—e.g., instructions to store expected sequence numbers for various flows, to compare the expected sequence numbers with the actual sequence numbers of the received packets, and to report discrepancies between the expected and actual sequence numbers may all be part of a generated action in some embodiments. Actions 626 comprising anomaly detection and/or reporting operations may be provided to the AINs 628 and implemented for the flows for which the actions are designated. The action-based enablement approach 606 may allow clients to customize the types of anomaly detection to be performed, to indicate conditions under which anomaly detection is to be performed, and in general control the anomaly detection operations at a finer granularity in various embodiments than may be feasible using AIN settings. Note that actions generated at the DMNs may be used to detect various categories of anomalies in different embodiments, and that sequence number-based anomaly detection is just one example.

Anomaly Metrics Destinations

Figure 7:
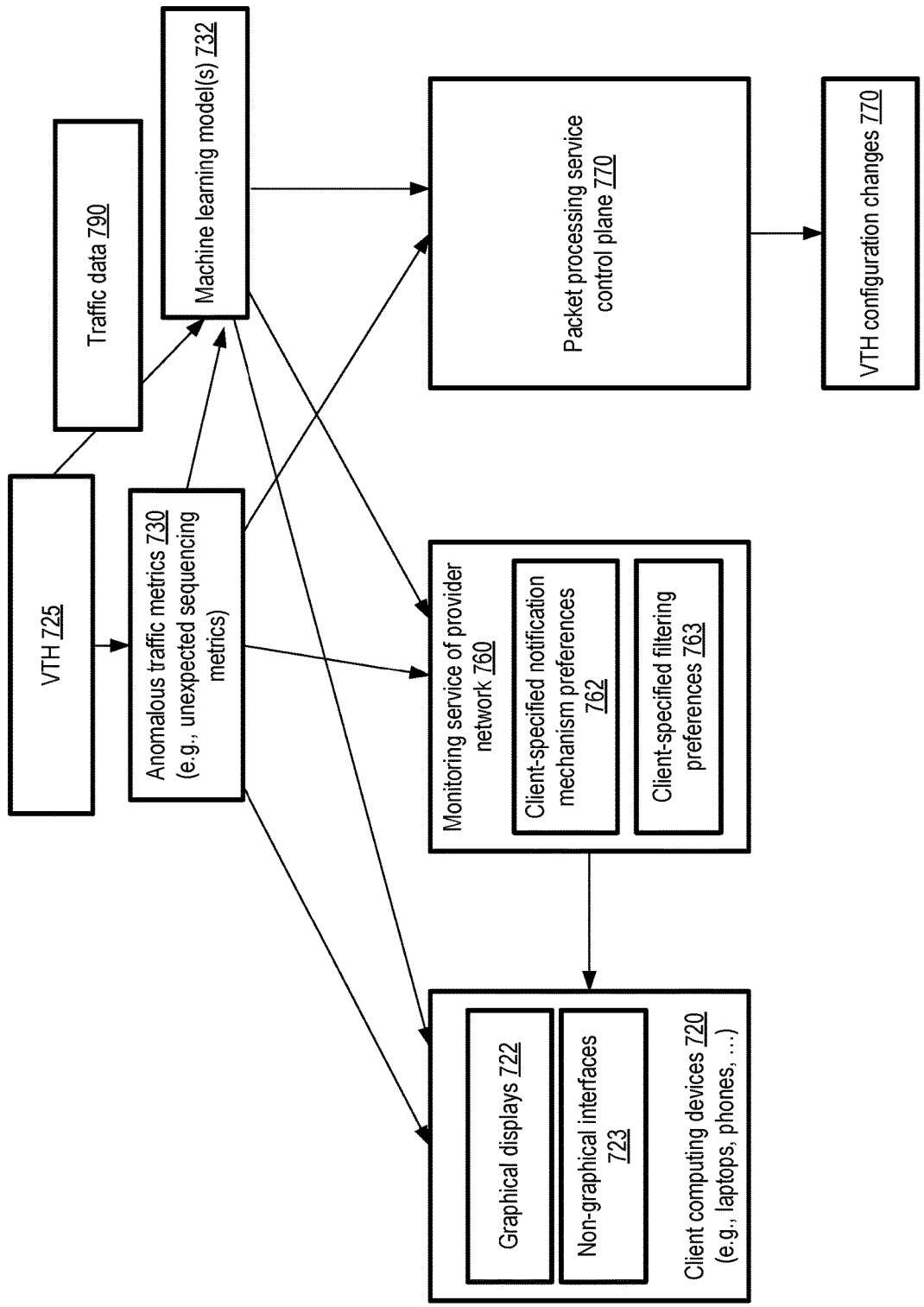
FIG. 7 illustrate example destinations to which anomaly metrics collected at a virtual traffic hub may be provided, according to at least some embodiments.

FIG. 7 illustrate example destinations to which anomaly metrics collected at a virtual traffic hub may be provided, according to at least some embodiments. As discussed earlier, any of several techniques may be used to enable the collection of anomaly metrics at a virtual traffic hub (VTH) 725 in various embodiments. At one or more layers of the VTH, expected properties of to-be-received packets of various flows may be stored, and such expected properties (e.g., sequence numbers or other sequence indicators) may be compared to actual properties of received packets to detect anomalies in at least some embodiments. Alternatively, analysis of actual properties of packets, without necessarily storing expected properties, may be used to detect anomalies of various types in different embodiments.

Metrics 730 of such anomalies (e.g., rates of various types of anomalies, counts of the anomalies, etc.) may be provided programmatically to a variety of destinations in at least some embodiments. In some embodiments, at least a subset of the metrics 730 may be presented at client computing devices (e.g., laptops, phones, desktops etc.) for viewing by customers of the packet processing service at which the VTH is established. In various embodiments, the metrics may be presented using graphical displays 722 (e.g., showing graphs representing time series values of the anomaly metrics over client-selected time ranges or default time ranges) and/or via non-graphical interfaces 723 (e.g., via emails, text messages, etc.).

In at least some embodiments, the provider network at which the packet processing service of the VTH 725 may also include a monitoring service 760. Such a monitoring service may be used to present metrics collected from a variety of sources selected by a client, including for example the packet processing service, a virtualized computing service, various database or storage services and the like. A client of the monitoring service 760 may provide guidance regarding various aspects of the metrics to be collected and presented, e.g., including notification mechanism preferences 762, filtering preferences 763 and the like in different embodiments. The notification mechanism preferences 762 may, for example, indicate the particular interfaces or communication types to be used to present traffic anomaly information collected at the VTH, e.g., whether text messaging is to be used, email is to be used, a graphical user interface is to be updated in real-time with anomaly metrics, and so on. The filtering preferences 763 may, for example, include client-selected reporting thresholds for anomaly metrics in some embodiments—e.g., some clients may only wish to be notified if the average or maximum number of out-of-sequence packets received per second is greater than N over an M-minute interval. In some embodiments, other types of filtering preferences 763 may be indicated by clients—e.g., only anomalies associated with a particular isolated network's outbound traffic during some specified hours of the day may be reported based on a filtering preference. Note that in some embodiments, notification mechanism preferences 762 and/or filtering preferences 763 may be indicated to the packet processing service by a client, instead of being provided to a monitoring service—that is, clients may be able to customize the manner in which the anomaly metrics are presented, and the manner in which the metrics are filtered for presentation, even if a monitoring service 760 is not being used.

In addition to or instead of being provided to clients of the packet processing service, at least some anomaly metrics 730 may be transmitted to the control plane 770 of the packet processing service in one embodiment. There, the anomaly metrics may be analyzed to determine whether VTH configuration changes 770 are to be triggered. For example, in some embodiments, high rates of anomalies associated with one or more nodes of a VTH may lead to the replacement of the nodes, and/or to the deployment of additional nodes to share the workload of those nodes. According to at least some embodiments, one or more machine learning models 732 may be trained to analyze network traffic data 790 similar to the anomaly-related data collected at the VTHs, and to identify various categories of potential unusual or anomalous patterns of traffic using the data. Anomalous patterns detected using the machine learning model(s) may be provided to various destinations in such embodiments, including for example to client devices 720, to a monitoring service 620 which may in turn report the anomalous patterns to clients, and/or to the packet processing service control plans 770.

Example Programmatic Interactions For VTHs Performing Anomaly Detection

Figure 8:
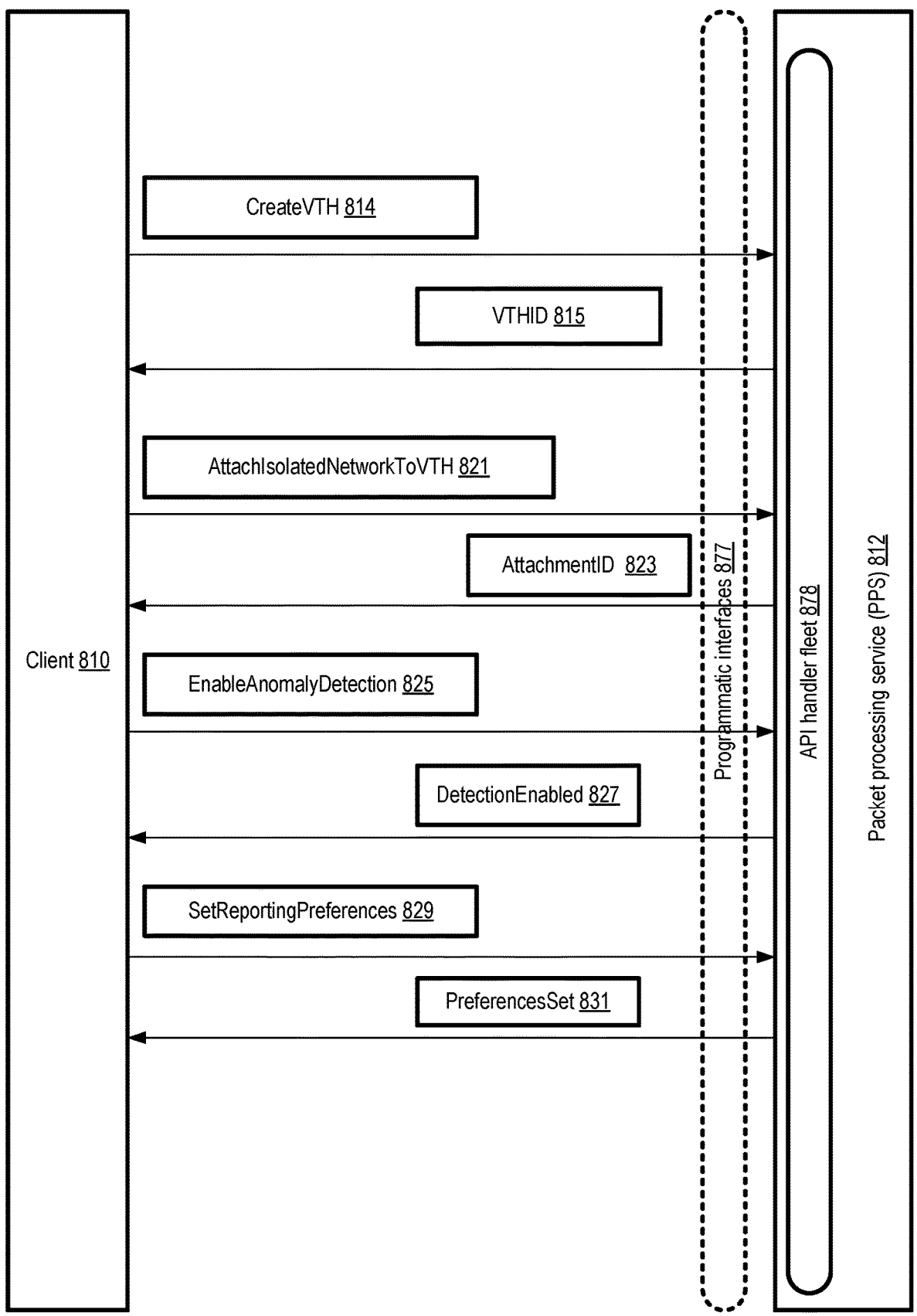
FIG. 8 illustrates example programmatic interactions between clients and a packet processing service at which virtual traffic hubs may be used to detect traffic anomalies, according to at least some embodiments.

FIG. 8 illustrates example programmatic interactions between clients and a packet processing service at which virtual traffic hubs may be used to detect traffic anomalies, according to at least some embodiments. One or more programmatic interfaces 877 may be implemented by the packet processing service 812 at which virtual traffic hubs are established in the depicted embodiment. Such interfaces may include, for example, a set of application programming interfaces (APIs) that are received by an API handler fleet 878 of the PPS control plane in some embodiments. Interfaces 877 may include graphical user interfaces, command line tools, web-based consoles and the like in at least one embodiments.

A client 810 of the PPS 812 may submit a CreateVTH request 814 to initiate the process of configuring a VTH in the depicted embodiment. In response to the CreateVTH request, the PPS may provide a VTHID (identifier) 815 in some embodiments, indicating that the requested VTH has been created (e.g., that metadata representing the VTH has been stored).

To attach an isolated network to the VTH, an AttachIsolatedNetworkToVTH request 821 may be submitted via the interfaces 877 in some embodiments. In response, an attachment identifier 823 may be provided in at least some embodiments to the client, indicating a successful attachment of the network to the VTH. Similar attachments may be requested and performed for all the different isolated networks whose traffic is to be processed by the VTH in the depicted embodiment. In at least one embodiment, in addition to programmatically attaching an isolated network, additional programmatic interactions may be required before the traffic of the isolated network can be processed at the VTH—e.g., a routing table to be used for outbound traffic from the isolated network may be specified programmatically, entries with destination endpoints within the isolated network may be propagated programmatically to various routing tables of the VTH, and so on.

In the depicted embodiment, an EnableAnomalyDetection request 825 may be submitted by a client to start the detection and reporting of anomalies of the kinds discussed earlier. In response, after the appropriate guidance regarding anomaly detected and propagation has been provided to one or more layers of the VTH, and/or after the appropriate settings values have been applied to enable anomaly detection, a DetectionEnabled message 827 may be sent to the client 810. Note that in some embodiments, one or more types of anomaly detection may be performed by default, and the client may not need to submit a programmatic request for such types of anomaly detection. The client 810 may submit or modify reporting preferences for the anomaly metrics collected at the VTH in some embodiments, e.g., via SetReportingPreferences messages 829. Such preferences may include, for example, filtering preferences indicating thresholds or conditions to be checked before reporting anomaly metrics, notification mechanism preferences and the like (similar to the notification preferences and filtering preferences discussed in the context of FIG. 7) in various embodiments. After the preferences requested by the client have been applied, in at least some embodiments a PreferencesSet message 831 may be transmitted to the client.

Note that a different combination of programmatic interactions may be supported in some embodiments for configuring and using VTHs than that shown in FIG. 8. For example, in one embodiment, several of the operations discussed may be performed in response to a single request instead of using separate requests: e.g., a combined request may be used to create a VTH and attach a set of isolated networks to it, and so on.

Methods for VTH-based Traffic Anomaly Detection

Figure 9:
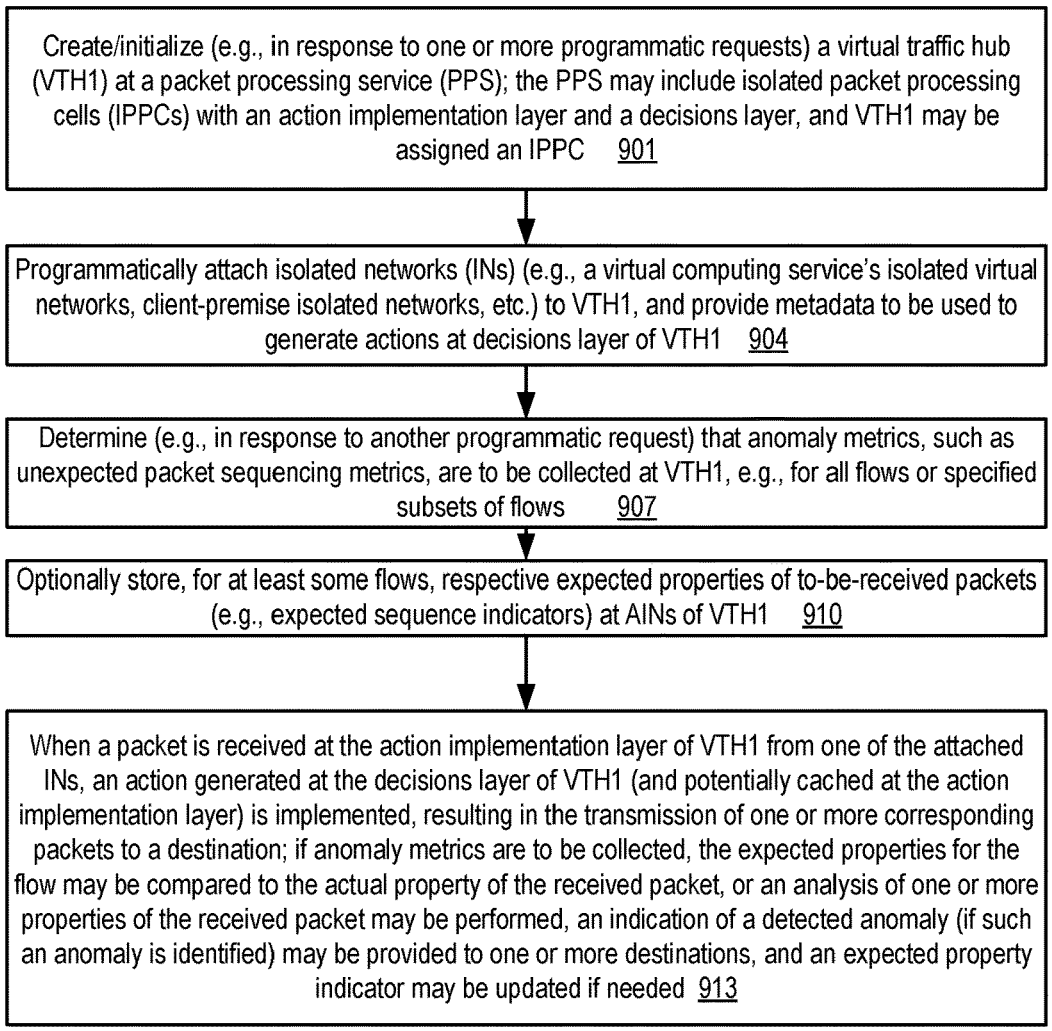
FIG. 9 is a flow diagram illustrating aspects of operations that may be performed to detect network traffic anomalies at virtual traffic hubs of a packet processing service, according to at least some embodiments.

FIG. 9 is a flow diagram illustrating aspects of operations that may be performed to detect network traffic anomalies at virtual traffic hubs of a packet processing service, according to at least some embodiments. As shown in element 901, an instance of a virtual traffic hub (VTH1) may be created and initialized at a packet processing service (PPS) of the kind discussed earlier (e.g., similar to PPS 202 of FIG. 2) in at least some embodiments, e.g., in response to one or more programmatic requests. The PPS may include isolated packet processing cells (IPPCs) with a set of nodes of an action implementation layer and a decisions layer in some embodiments, and VTH1 may be assigned a particular IPPC comprising one or more nodes of both layers in such an embodiment.

A set of isolated networks (INs) (e.g., a virtual computing service's isolated virtual networks, client-premise isolated networks connected to a provider network at which the PPS is implemented using VPN connections and/or dedicated physical links, etc.) may be programmatically attached to VTH1 (element 904) in the depicted embodiment. In at least some embodiments, clients of the PPS may submit programmatic requests similar to those discussed earlier for the attachment and other aspects of VTH configuration, and programmatically provide metadata (based for example on the logic of the networking application for which VTH1 is set up) to be used to generate actions at decisions layer of VTH1.

In at least some embodiments, a determination may be made (e.g., in response to another programmatic request) that anomaly metrics, such as unexpected packet sequencing metrics, are to be collected at VTH1, e.g., for all flows or specified subsets of flows (element 907). A number of approaches may be taken in different embodiments to enable anomaly metrics collection or anomaly detection as discussed earlier—e.g., settings that apply to all flows of one or more network protocols that are processed at a set of action implementation nodes (AINs) may be used in some embodiments, or the logic of anomaly detection may be incorporated within the metadata used to generate the actions, and so on.

Based on the determination that anomaly metrics are to be collected, in at least some embodiments, values of respective expected properties of yet-to-be-received packets (such as packet sequence numbers or other sequence indicators, packet size ranges etc.) may optionally be stored at one or more nodes of VTH1 (element 910), such as one or more AINs and/or decision master nodes (DMNs).

When a packet is received at the action implementation layer of VTH1 from one of the attached INs, an action generated at the decisions layer of VTH1 (and potentially cached at the action implementation layer) may be implemented in the depicted embodiment, resulting in the transmission of one or more corresponding packets to a destination. If anomaly metrics are to be collected, the expected properties for the packets of the flow (if they were stored) may be compared to the actual property of the received packet. In some embodiments, as mentioned earlier, expected values need not necessarily be stored at VTH1 nodes; instead, anomalies may be detected based on an analysis of the actual properties of received packets. For example, the sequence numbers of N successive received packets, or the sizes of N successive received packets, may be compared with one another to detect potential anomalies. An indication of a detected anomaly (if such an anomaly is identified) may be provided to one or more destinations, and the expected property indicator may be updated if needed in various embodiments (element 1013).

It is noted that in various embodiments, at least some operations other than those illustrated in the flow diagram of FIG. 9 may be used to implement the traffic anomaly detection and packet processing-related techniques described above. Some of the operations shown may not be implemented in some embodiments or may be implemented in a different order, or in parallel rather than sequentially.

Use Cases

The techniques described above, of detecting anomaly metrics with respect to network traffic flowing between various isolated networks at a scalable virtual traffic hub of a packet processing service may be useful in a variety of scenarios. As more and more distributed applications are migrated to provider network environments, especially environments in which isolated networks can be established for different clients, the need for quickly providing actionable metrics pertaining to the network traffic is only increasing. In many cases, the number of individual devices interconnected using virtual traffic hubs the packet processing service, including devices both within and external to the provider network at which the packet processing service is implemented, may be extremely large, and many of the devices and links used may be multi-tenant. Furthermore, many of the devices (such as network switches) may not be designed to capture configurable anomaly metrics pertaining to various individual flows. By incorporating anomaly detection logic into nodes of the virtual traffic hubs, which already perform packet processing at the per-flow level, customizable measures of unexpected traffic patterns may be collected and potentially aggregated with minimal additional resource usage. Such measures may be reported using mechanisms selected by clients, and may be used for example to help narrow down the root cause of, and initiate reconfiguration operations to quickly resolve, various types of hard-to-diagnose networking problems.

Illustrative Computer System

Figure 10:
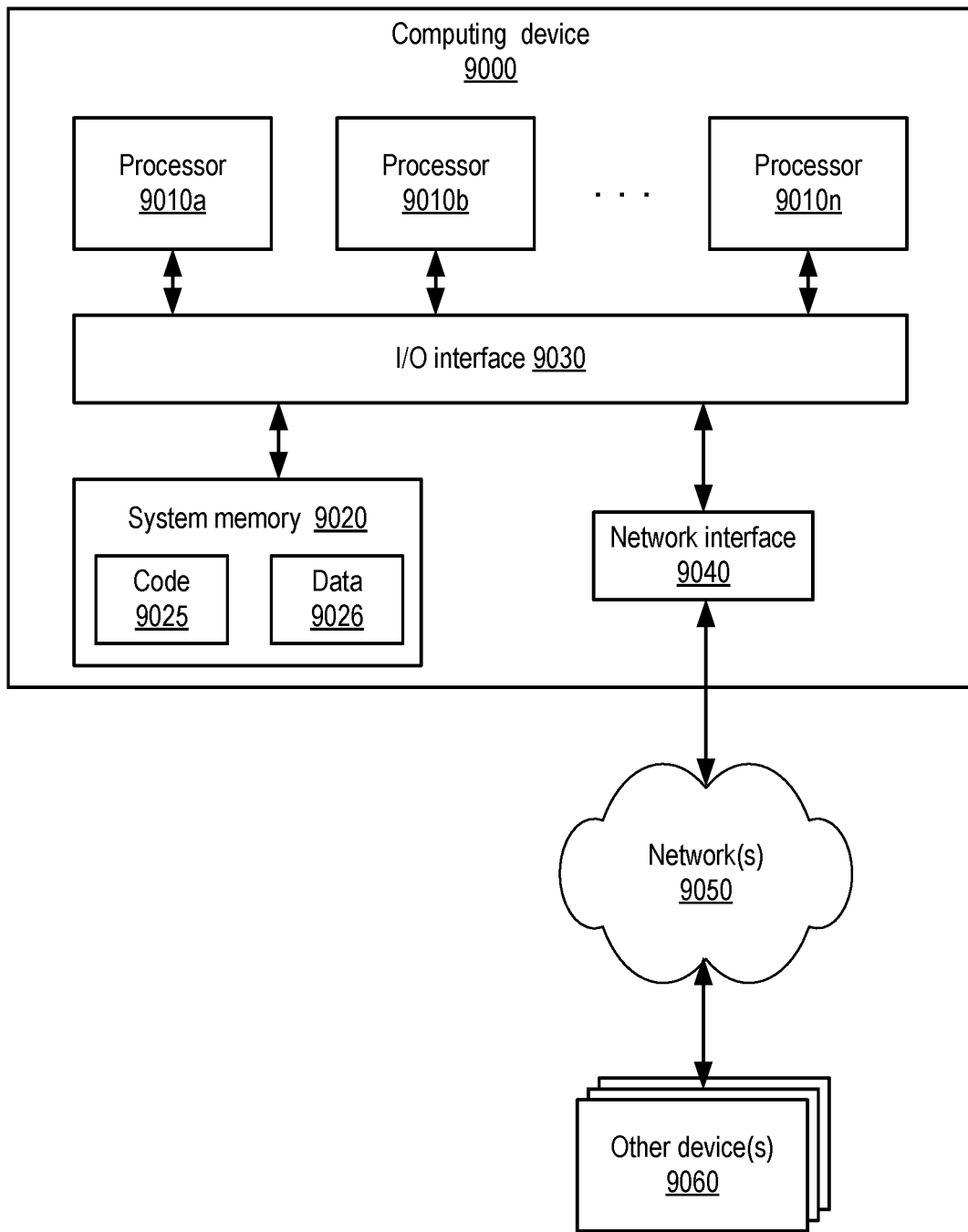
FIG. 10 is a block diagram illustrating an example computing device that may be used in at least some embodiments.

In at least some embodiments, a server that implements a portion or all of one or more of the technologies described herein, including the various data plane and control plane components of packet processing services and client-side devices that may interact programmatically with such services, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of a packet processing service;
   wherein the one or more computing devices include instructions that upon execution on or across one or more processors cause the one or more computing devices to:
   programmatically attach a plurality of isolated networks, including a first isolated network and a second isolated network, to a virtual traffic hub established on behalf of a client of the packet processing service, wherein the virtual traffic hub comprises one or more action implementation nodes and one or more decision master nodes, wherein individual ones of the action implementation nodes implement one or more routing actions on network packets received at the virtual traffic hub, wherein the one or more routing actions are generated at the one or more decision master nodes;
   determine that anomalous sequencing metrics are to be collected with respect to at least a first flow of packets processed at the virtual traffic hub, wherein at least some packets of the first flow originate at the first isolated virtual network;
   compare, at the one or more action implementation nodes, (a) a respective expected sequence indicator for one or more packets of the first flow with (b) a respective actual sequence indicator of the one or more packets;
   perform, at the one or more action implementation nodes, one or more of the routing actions generated at the one or more decision master nodes on the one or more packets of the first flow, resulting in a transmission of corresponding packets to one or more destinations, wherein at least some destinations of the one or more destinations are in the second isolated network; and cause an indication of a detected anomalous packet sequence of the first flow to be provided to the client via a programmatic interface, wherein the anomalous packet sequence is detected at least in part using the comparison of the expected sequence indicators and the actual sequence indicators.

2. The system as recited in claim 1, wherein the determination that anomalous sequencing metrics are to be collected with respect to the first flow is based at least in part on a networking protocol being used for the first flow.

3. The system as recited in claim 1, wherein the determination that anomalous sequencing metrics are to be collected with respect to the first flow is based at least in part on a programmatic request indicating one or more flows for which the anomalous sequencing metrics are to be collected.

4. The system as recited in claim 3, wherein the programmatic request indicates, with respect to individual flows for which anomaly metrics are to be collected, one or more of: (a) a source network address, (b) a source network port, (c) a destination network address, (d) a destination network port, (e) a networking protocol, (f) a source isolated network, (g) a destination isolated network, or (h) a packet processing application category.

5. The system as recited in claim 1, wherein the one or more computing devices further include instructions that upon execution on or across one or more processors cause the one or more computing devices to:
obtain an indication, via a programmatic interface, of a reporting threshold for anomalous sequencing metrics of at least a second flow; and
cause a filtered representation of anomalous packet sequencing metrics of the second flow to be provided to a client of a packet processing service, wherein the filtered representation is generated using the reporting threshold.

6. A method, comprising:
performing, at one or more computing devices:
determining that anomaly metrics are to be collected with respect to at least a first flow of packets processed at a virtual traffic hub, wherein the virtual traffic hub comprises an action implementation layer and a decisions layer, wherein routing actions generated at the decisions layer are performed at the action implementation layer on packets received at the action implementation layer from one or more isolated networks;
comparing, at one or more nodes of the virtual traffic hub, (a) a respective expected property of one or more packets of the first flow with (b) a respective actual property of the one or more packets; and
causing an indication of a detected anomaly of the first flow to be provided to one or more destinations, wherein the anomaly is detected at least in part using the comparison of the expected property and the actual property.

7. The method as recited in claim 6, wherein determining that anomaly metrics are to be collected for the first flow is based at least in part on identifying a communication protocol being used for the first flow.

8. The method as recited in claim 7, wherein the communication protocol comprises one or more of: (a) the Transmission Control Protocol (TCP), (b) the Internet Control Message Protocol (ICMP).

9. The method as recited in claim 6, wherein determining that the anomaly metrics are to be collected for the first flow is based at least in part on a programmatic request from a client of a packet processing service.

10. The method as recited in claim 9, wherein the programmatic request indicates, with respect to individual flows for which anomaly metrics are to be collected, one or more of: (a) a source network address, (b) a source network port, (c) a destination network address, (d) a destination network port, (e) a networking protocol, (f) a source isolated network, (g) a destination isolated network, or (h) a packet processing application category.

11. The method as recited in claim 6, further comprising performing, by the one or more computing devices:
obtaining an indication, via a programmatic interface, of a reporting threshold for anomaly metrics; and
causing a filtered representation of anomaly metrics to be provided to a client of a packet processing service, wherein the filtered representation is generated using the reporting threshold.

12. The method as recited in claim 6, wherein the one or more destinations includes a device of a client of a packet processing service, further comprising performing, by the one or more computing devices:
causing a notification mechanism, specified programmatically by the client, to be used to present the indication of a detected anomaly at the device o the client.

13. The method as recited in claim 6, wherein the expected property comprises a sequence indicator, the method further comprising performing, at the one or more computing devices:
generating, at the decisions layer, an executable action corresponding to the first flow, wherein the action comprises a directive to (a) store an indication, at the action implementation layer, of the expected sequence indicator of packets of the first flow and (b) compare the expected sequence indicator with an actual sequence indicator; and
transmitting the executable action from the decisions layer to the action implementation layer in response to a request from the action implementation layer.

14. The method as recited in claim 6, wherein the virtual traffic hub is established at a provider network, wherein the indication of the detected anomaly triggers a configuration change of one or more resources of the provider network.

15. The method as recited in claim 6, further comprising performing, by the one or more computing devices:
obtaining a machine learning model trained to analyze network traffic data collected at the virtual traffic hub;
utilizing the machine learning model to detect at least one anomalous traffic pattern of a flow; and
providing an indication of the anomalous traffic pattern to a destination.

16. Non-transitory computer-accessible storage media storing program instructions that when executed on one or more processors cause one or more computer systems to:
receive at least some packets of a first flow at a virtual traffic hub, wherein the virtual traffic hub comprises an action implementation layer and a decisions layer, wherein routing actions generated at the decisions layer are performed at the action implementation layer on packets received at the action implementation layer from one or more isolated networks;
analyze, at one or more nodes of the virtual traffic hub, one or more properties of one or more packets of the first flow; and
cause an indication of a detected anomaly of the first flow to be provided to one or more destinations, wherein the anomaly is detected at least in part using a result of said analyze.

17. The non-transitory computer-accessible storage media as recited in claim 16, further storing program instructions that when executed on one or more processors further cause the one or more computer systems to:
- determine that anomaly metrics of one or more flows including the first flow are to be collected at the virtual traffic hub; and
- determine that anomaly metrics of at least one flow are not to be collected at the virtual traffic hub.

18. The non-transitory computer-accessible storage media as recited in claim 17, further storing program instructions that when executed on one or more processors further cause the one or more computer systems to:
- determine, based at least in part on a network protocol being used for the first flow, that the anomaly metrics of the first flow are to be collected at the virtual traffic hub.

19. The non-transitory computer-accessible storage media as recited in claim 17, further storing program instructions that when executed on one or more processors further cause the one or more computer systems to:
- determine, based at least in part on a programmatic request from a client of a packet processing service, the anomaly metrics of the first flow are to be collected at the virtual traffic hub.

20. The non-transitory computer-accessible storage media as recited in claim 16, further storing program instructions that when executed on one or more processors further cause the one or more computer systems to:
- cause a time series representation of one or more anomalies, including the detected anomaly of the first flow, to be presented to at least one destination of the one or more destinations.

* * * * *